United States Patent [19]

Chrisman et al.

[11] Patent Number: 5,365,326
[45] Date of Patent: Nov. 15, 1994

[54] METHOD AND APPARATUS FOR DETERMINING FLOW RATES AND CONCENTRATIONS IN MULTI-PHASE STREAMS

[75] Inventors: Ray W. Chrisman; Raymond A. Cocco, both of Midland, Mich.; John A. Cleveland, Jr., Zionsville, Ind.

[73] Assignee: The Dow Chemical Company, Midland, Mich.

[21] Appl. No.: 17,077

[22] Filed: Feb. 12, 1993

[51] Int. Cl.$^5$ .................... G01P 3/36; G01N 21/00
[52] U.S. Cl. ................... 356/28.5; 356/28; 356/342
[58] Field of Search ............... 356/28, 28.5, 342

[56] References Cited

U.S. PATENT DOCUMENTS

| | | | |
|---|---|---|---|
| 3,946,224 | 3/1976 | Allera et al. | 356/28 |
| 4,707,134 | 11/1987 | McLachlan et al. | 356/342 |
| 4,978,863 | 12/1990 | Lyons et al. | 250/574 |

OTHER PUBLICATIONS

Chabot, et al., "Fluid Dynamics Studies of Bubble and Slurry Bubble Columns Gas Phase Behaviour", Chemical Reactor Engineering Center, Unpublished Report, (1992), pp. 1–23.
Yang, et al., "Investigation On Slip Velocity Distribution In The Riser Of Dilute Circulating Fluidized Bed", Unpublished Report—Tsinghau University, pp. 1–12.
Xia, et al., "Characterizing fast fluidization by optic output signals", *Powder Technology,* 72 (1992) pp. 1–6.
Lischer, et al., "Optical fiber measurements of particle concentration in dense suspensions: calibration and simulation", *Applied Optics,* vol. 31, No. 24, Aug. 20, 1992, pp. 5106–5113.
Rensner, et al., "Modeling and Application of a Fiber Optical Measuring System for Higher Concenrated Multiphase Flows", Technical University Hamburg-Harburg.
Rensner, et al., "Different Types of Optical Probes for Investigations in Highly Concentrated Gas/Solid Flows", Technical University Hamburg-Harburg.
Werther, et al., "Measurement techniques for gas–solid fluidized-bed reactors", *Int. Chem. Eng.* 33, (1993) 1, p. 18/27
Rensner, et al., "Estimation of the Effective Measuring Volume of Single Fiber Reflexion Probes for Solids Volume Concentration Measurements", Technical University Hamburg-Harburg.
Werther, et al., "Messtechniken für Gas/Feststoff-Wirbelschichtreaktoren", (German Publication).

*Primary Examiner*—Stephen C. Buczinski
*Attorney, Agent, or Firm*—J. B. Treangen

[57] ABSTRACT

This invention relates to a method for simultaneously determining particle concentration and velocity in multi-phase streams. These determinations may be made by use of a fiber optic probe that establishes an illuminated sensing zone of finite dimensions. The probe collects light backscattered from the zone at discrete points in time. The collected light is converted to a voltage waveform. By taking the mean of the voltage values, concentration can be determined, and, by taking a derivative of the voltage waveform, the velocity can be determined.

9 Claims, 5 Drawing Sheets

METHOD AND APPARATUS FOR DETERMINING FLOW RATES AND CONCENTRATIONS IN MULTI-PHASE STREAMS

This invention relates to a method and apparatus for simultaneously determining particle velocity and concentration in multi-phase streams by sampling and taking a derivative and mean of backscattered light at discrete periods of time.

BACKGROUND OF THE INVENTION

Measuring concentration ("solids loading") and velocity ("flow rate") in dynamic gas-solid or liquid-solid ("multi-phase") systems has traditionally been a complicated problem. Standard techniques do not provide enough information and are often plagued by low sensitivity. Moreover, few are flexible enough to be employed in an in-situ environment.

Velocities of multi-phase streams, such as those including suspended solids, have been measured by cross correlation of upstream and downstream detector outputs based on the time change required for suspended solids to flow from the upstream detector to the downstream detector. Procedures of this type may not be of adequate dependability if, for example, disturbances occur in the multi-phase stream that scramble the position or orientation of the suspended solids being tracked during transit thereof between the two detectors. Such scrambling may occur, particularly, in turbulent stream flow.

Where two or more spaced probes are used, alignment of the probes with respect to the direction of stream flow is essential. Additionally, use of multiple spaced probes inherently extends the time in which a desired analysis of a multi-phase stream flow can be accomplished.

In an effort to stabilize stream flow to permit a more accurate determination of velocity, a system utilizing a vortex-producing member located upstream from a pair of spaced probes has been proposed. A series of time-related vortices is generated and autocorrelations of the outputs of the spaced probes, based on the time period between consecutively generated vortices, are averaged.

Another approach to determining the flow rate of a multi-phase stream involves fiber optic illumination of at least a segment of the stream and transmission of images of particles flowing past an endoscope as recorded with a camera and viewed on a monitor. Under this method, image analysis is relied upon to obtain flow rate.

Other known systems use optical fibers to measure bubble flow rate and size. One such system relies on Doppler shifting of monochromatic light. In operating this system, a bubble impinges on one end of an optical fiber with the fiber penetrating a first surface portion of the bubble. Subsequently, upon movement of the bubble, a second surface portion is penetrated by the fiber in order to obtain a velocity measurement.

As has been explained, most known systems rely on cross correlation techniques. Alignment of the sensors is critical if such techniques are to be effective. Additionally, two channels of data need to be sensed and processed. An advancement over these known flow rate determination procedures is disclosed by Lyons et al. (U.S. Pat. No. 4,978,863). Lyons et al. disclose a method for determining the flow rate of particles in a fluid medium by measuring backscattered light, converting the backscattered light to voltage, digitizing the voltage at discrete points in time to form an array of numbers ("voltage waveform"), and autocorrelating this voltage waveform. The autocorrelation of more than one voltage waveform at different time delays may then be normalized by the value of the autocorrelation at zero time. Lyons et al. disclose that each time delay corresponding to fifty percent decorrelation is inversely proportional to the flow rate of the stream. Lyons et al. use an apparatus that comprises: a single fiber optic probe provided with at least two optical fibers, one to transmit light and the other to collect backscattered light; a light source; a light detector; and an autocorrelator. The single probe design eliminates the criticality of detector alignment demonstrated in prior art.

Notwithstanding the advances by Lyons et al., some problems still persist. First, if the concentration fluctuates significantly during the voltage waveform acquisition, a time constant for these fluctuations will be reflected in the fifty percent autocorrelation time since autocorrelation is essentially a time averaging function. Second, extensive array manipulations inherent in an autocorrelation algorithm require a great deal of computing time. For example, a single analysis can run over twelve minutes on an 8 mHz computer. Third, when several particles simultaneously occupy a field of view and each particle is only slightly resolved, the autocorrelation technique treats multiple response peaks (one for each particle) as a single peak whose width will be averaged with that of other arrays. Thus, the more concentrated the particles in a fluid medium, the less accurate the autocorrelated velocity calculation.

In addition, at present, no single technique is both flexible and practical enough to simultaneously determine the concentration and velocity of multiple particles in concentrated gas-solid media. This shortcoming plagues efforts to model kinetic and hydrodynamic behavior in fluidized beds and riser reactors.

SUMMARY OF THE INVENTION

The present invention is an improved method for determining particle velocity in a fluid medium containing particles capable of backscattering light by illuminating a single, finite and symmetrical zone of said fluid medium with light capable of being backscattered by said particles, collecting backscattered light from said zone, converting said backscattered light into at least one voltage waveform with respect to time, and determining velocity from said waveform(s), the improvement comprising determining velocity of said particles by computing a derivative of the voltage waveform(s) with respect to time, normalizing the derivative with respect to concentration, and multiplying the normalized derivative by a calibration constant, $k'$.

A second aspect of this invention is a method wherein said improvement also comprises determining the concentration of said particles by computing an average voltage value of said voltage waveform and multiplying the value by a calibration constant, $k$.

The present invention constitutes a substantial improvement over known flow rate determination procedures, and provides the flexibility and practicality to simultaneously determine the concentration and velocity of multiple particles in a fluid medium. The technique is versatile in that it can be used in multi-phase systems ranging from lean to dense phase (e.g. void volumes ranging from 40–100%), and, for this reason,

THE DRAWINGS

FIG. 3 illustrates: (a) a single peak waveform; (b) a first derivative corresponding to the waveform (maximum=5.00); and an (c) autocorrelation ($t_{50}=43$) profile.

FIG. 4 illustrates: (a) a multiple peak waveform; (b) a first derivative corresponding to the waveform (maximum=5.00); and an (c) autocorrelation ($t_{50}=196$) profile.

FIG. 5 illustrates: (a) a multiple and single isolated peak waveform; (b) a first derivative corresponding to the waveform (maximum=5.00); and an (c) autocorrelation ($t_{50}=110$) profile.

DETAILED DESCRIPTION OF THE INVENTION

The present invention relates to the use of light, directed into a multi-phase stream, to establish an illuminated sensor zone of finite dimensions. Backscattered light from the sensor zone is sensed by a light detector and converted to a voltage. The voltage is measured at discrete points in time, and the measurements are digitized to produce a one-dimensional array of numbers. With respect to time, the array of numbers forms a voltage waveform peak for each particle passing through the sensor zone. The width of the peak is inversely proportional to the rate of flow of the particle through the sensor zone. Since the width of a peak is inversely proportional to the slope of the peak, a derivative of the peak is also inversely proportional to the width of the peak. Thus, a derivative function of the voltage waveform peak, normalized with respect to concentration, and multiplied by an appropriate calibration constant, provides the velocity of the particle. In addition, a mean of the voltage waveform, multiplied by an appropriate calibration constant, provides the concentration of particles in the fluid medium.

As used herein, a multi-phase stream includes gaseous or liquid streams containing particles with a volumetric displacement of up to, and including, sixty percent of total stream volume. Although the term "particles" is used herein, such term is intended to encompass all forms of light scattering materials present in discontinuous form in a fluid medium. Thus, the "particles" may be in the form of solids, bubbles, or immiscible droplets. Preferably, however, all particles have a size of at least 10 microns.

It should be understood that different apparatus can be used to practice the method of the instant invention. A preferred apparatus is disclosed in Lyons et al. (U.S. Pat. No. 4,978,863), as discussed in the Background section. The relevant teachings of this patent are hereby incorporated by reference. Some specifically relevant portions from Lyons et al. are set out parenthetically as follows and correspond to terminology used herein: "Illuminating a single, finite, and symmetrical zone" (Lyons et al., col. 4, lines 52-57; col. 3, lines 28, 48-50; col. 5, line 3); "collecting backscattered light" (Lyons et al., col. 3, lines 48-50); and "converting said backscattered light into at least one voltage waveform with respect to time" (Lyons et al., col. 5, lines 9-11). Use of the single probe design described by Lyons et al. not only eliminates alignment problems, but also minimizes the number of required data channels. Thus, the single probe design eliminates more elaborate calculations and system functions while it increases the speed of response. The geometry of the light collector fiber of the probe is symmetrical with respect to the probe axis. Therefore, precise rotational positioning of the probe with respect to the axis is not critical. The size and location of the volume to be measured by the probe may be controlled for specific applications by varying the geometry of the probe at the time of construction. This enables operation over a wide range of particle sizes and concentrations. Thus, the method and apparatus described are flexible and offer a wide range of effective utilization in a cost and time effective manner.

While more specifics will be set forth, a number of known types of optical fiber will function in this single probe system and any suitable light source capable of being transmitted by a fiber may be used. For example, a conventional incandescent bulb or light emitting diode (LED) may be used. As disclosed in Lyons et al., col. 4, lines 52-57, optical intersection of the probe fibers on the outer surface of the probe establishes a single, finite, sensing zone in the fluid medium. As the multi-phase stream flow carries a given set of particles or light scattering centers through the sensing zone, such given set of particles is repeatedly replaced by a following set of particles. The time scale over which a fresh set of particles is swept into the sensing zone is inversely proportional to the velocity of the stream in the sensing zone.

A photodiode that converts collected light to a voltage is preferably used as a light detector. An amplifier may be used to amplify the light detector output. The output of the light detector is sampled by a voltage processor that: (1) forms a voltage waveform with respect to time by accepting signals constituting the voltage output of the light detector; (2) digitizes the signals; (3) corrects for baseline (optional); and (4) correlates subsequent digitized values to concentrations and relative absolute velocities.

Particle concentration ("solids concentration") is proportional to the mean intensity, or mean voltage value, of the voltage waveform. Mean intensity can be represented by the following:

$$\Gamma = \frac{\sum_{n=1}^{N} V(n)}{N} \qquad \text{Equation 1}$$

where V is the voltage output of the detector and n is an index to denote equally spaced discrete points in time. N is the total number of data points collected and $\Gamma$ represents the mean intensity of light detected. Particle concentration in a multi-phase stream is proportional to the mean intensity $\Gamma$ as represented in Equation 2, Particle Concentration=$k\Gamma$        Equation 2 where k is a proportionality constant determined from calibrations, discussed infra.

Particle velocity is inversely proportional to a width of a peak on the voltage waveform. Since a width of a peak may be determined by calculating a derivative of the peak, a derivative function of the voltage waveform peak, multiplied by an appropriate calibration constant, provides the velocity of the particle. Preferably, the maximum first derivative of the voltage waveform is computed; but any derivative of the waveform may be used. For example, the maximum first derivative of the voltage waveform, $\Phi$, is determined by the relationship:

$$\Phi = \max\left(\frac{V(n) - V(n-1)}{t(n) - t(n-1)}\right) \text{ for } n = 2 \text{ to } N \qquad \text{Equation 3}$$

where t is the time at n and n−1, or the sampling period, and V retains the same meaning as defined above.

The average particle velocity ("solids velocity") in a multi-phase stream is proportional to the maximum derivative of the voltage waveform ($\Phi$) normalized to concentration according to the equation, $$\Omega = \frac{\Phi}{\Gamma^{\frac{1}{2}}} \qquad \text{Equation 4}$$

where $\Omega$ is the velocity modulus and is proportional to the average solids velocity via Particle Velocity=$k'\Omega$        Equation 5 where k' is a proportionality constant which can be determined from calibration, discussed infra.

Specific Embodiments of the Invention

The following examples are provided to illustrate the invention and should not be interpreted as limiting it in any way. Particle concentration and velocity measurements are collected over a wide range of concentrations and velocities. Different experimental apparatuses are used for lean phase, dense phase, and riser reactor calculations. "Experimental" measurements are made in order to calibrate the apparatuses and obtain proportionality constants k and k' for use in Equations 2 and 5, respectively. For purposes of these experimental measurements, "lean phase" is equal to concentrations of $\leq 5\%$ solids loading, and "dense phase" is equal to concentrations of $\geq 40\%$ solids loading. Unless stated otherwise, all parts and percentages are based upon total stream volume.

Lean Phase Measurements

For lean-phase transport, 600 micrometer ($\mu$m) alumina particles are stored in a 1 gallon (3.79 liter) feed hopper. The solid particles are allowed to free fall through a PYREX ™ brand glass tube. A ball valve is used to regulate the flow of solids into the glass tube. A fiber optic probe is inserted into a down flow device using a 0.50" (1.27 centimeter (cm)) SWAGELOK ™ brand tee located 72 cm down from the ball valve. TEFLON ™ brand polytetrafluoroethylene (PTFE) ferrules are used to fasten all fittings to the glass tube. The inner diameter of the ball valve, the SWAGELOK ™ tee, and the tube is $0.41 \pm 0.01$ inches ($1.04 \pm 0.03$ cm). The outer diameter of the tube is 0.50 inches (1.27 cm).

Experimental particle velocities are obtained by measuring the probe to ball valve height and calculating the terminal velocity of each free falling particle. The probe-to-ball valve distance is large enough to allow particles to reach terminal velocity well before they pass the fiber optic probe. For example, free falling 600 $\mu$m particles should reach terminal velocity in 40 cm, which is 32 cm shorter than the total probe-to-ball valve distance used in the experiment. The first 40 cm of the tube is referred as the "acceleration region," while the remainder is referred to as the "constant velocity region."

Experimental concentration is determined from mass flow measurements. Using a stop watch, a beaker is placed under the end of the tube and emitted particles are collected for a given length of time. The mass flow rate (M') is determined from the following relation: M'=(Mass of solids/collection time). Volumetric flow rate (V') is determined from the following relation: V'=M'/solids density. Solids volume ($V_s$) in the tube is determined from the following relation: $V_s$=(V')X(solids residence time). Thus, the experimental concentration (C) is determined from the following relation: $V_s$/total tube volume.

Particle residence times are determined from the time it takes a particle to reach its terminal velocity plus the time required to fall the remaining distance to the probe at the terminal velocity (i.e. amount of time accelerating plus time at terminal velocity). It is assumed that all particles leave the ball valve at zero velocity. This calculation may be expressed mathematically as follows:

$$t_{res} = \tfrac{1}{2}(V_t/g) + (H_{tube} - (\tfrac{1}{2}V_t^2/g))/V_t$$

wherein, $V_t$=terminal velocity, g=gravitational constant (9.81 m/s$^2$), and $H_{tube}$=height of the apparatus tube. Experimental solids velocity is then obtained by dividing the length of the apparatus tube ($H_{tube}$) by residence time ($t_{res}$).

Dense Phase Measurements

The dense phase transport experiments are performed in a device which circulates particles in a continuous fashion. The experiments are designed to emulate concentrations and velocities commonly found in cyclone diplegs. A stainless steel J-valve is used to regulate the flow of solids down a 0.50" (1.27 cm) outer diameter (hereinafter "OD") and 0.41" (1.04 cm) inner diameter (hereinafter "ID") tube or dipleg. After the J-valve, solids are pneumatically conveyed in a 0.50" (1.27 cm) OD TEFLON ™ brand PTFE rise tube (i.e., riser) to the hopper feed in a continuous fashion. All components in the dipleg are modified to meet the 0.41±0.01" (1.04±0.03 cm) ID requirements. The fiber optic probe is located 50 cm from the ball valve. However, since velocity is relatively constant throughout the dipleg, the probe position should not enter into the calculations.

Dense phase experimental particle velocities are determined by using a stop watch to measure the time taken for a tracer particle to traverse the 15 cm or 30 cm distances between timing marks. Tracer particles are 600 μm alumina particles colored black. In order to have statistically significant results, at least 15 tracers are clocked for each experimental run.

Experimental concentration is determined in a method similar to that described for the lean phase experiment, except that sample collection is made at a point where the rise tube enters into the feed hopper. Particle residence times are based on an assumption that the experimentally determined velocity is constant throughout the dipleg.

Riser Measurements

The riser apparatus is similar to that used for dense phase flow measurements except 180 cm of the 0.50" (1.27 cm) OD PTFE tube was replaced by the 0.50" (1.27 cm) OD and 0.41" (1.04 cm) ID PYREX TM brand glass tubing. The probe is positioned 130 cm upstream from the J-valve on the rise tube, far enough such that the particles should be traveling at constant velocity. Gross control of concentration is achieved by clamping down on the soft 0.50" (1.27 cm) OD TYGON TM brand vinyl tubing at the lower end of the dipleg.

Riser apparatus experimental particle residence times in the riser tube are calculated from the experimentally determined concentrations and the measured mass flows. As with the lean and dense phase experiments, mass flow is obtained by measuring the rate at which the sample beaker filled. Particle residence times are then determined from the relationship, Equation 6
$$t_{res,s} = \frac{V_{riser}(1-\epsilon)}{V'_{Solid}} = \frac{\rho_s H_{riser} A_{riser}(1-\epsilon)}{M'_{solid}}$$

where $V_{riser}$ is the riser volume, $\epsilon$ is the void volume (as calculated infra), $V'_{solid}$ is the solids volumetric velocity, $H_{riser}$ is the riser height, $\rho_s$ is the solids density, $M'_{sol}$ is the mass flow rate, and $A_{riser}$ is the cross sectional area of the riser. Average particle velocities are determined by dividing riser height by particle residence time.

Riser apparatus experimental concentrations are determined by depressurizing the feed line to the riser and terminating the feed gases, resulting in a collapse of air-born particles to the bottom of the tube. The height of the particles is then measured with a ruler. Concentrations are obtained from the relationship, Equation 7
$$1 - \epsilon = \frac{H_{pb}A_{riser}(1-\epsilon_{pb})}{H_{riser}A_{riser}} = \frac{H_{pb}}{H_{riser}}(1-\epsilon_{pb})$$

where $H_{pb}$ is the packed bed height, $\epsilon_{pb}$ is the packed bed void volume, and the other terms retain the same meaning as defined above. The resting height of the solids in the rise tube is the packed bed height. The packed bed void volume is determined to be 0.52 for the 600 μm alumina particles. In order to minimize experimental error, this procedure for obtaining concentration is performed at least five times for each experimental run.

Figure 1:
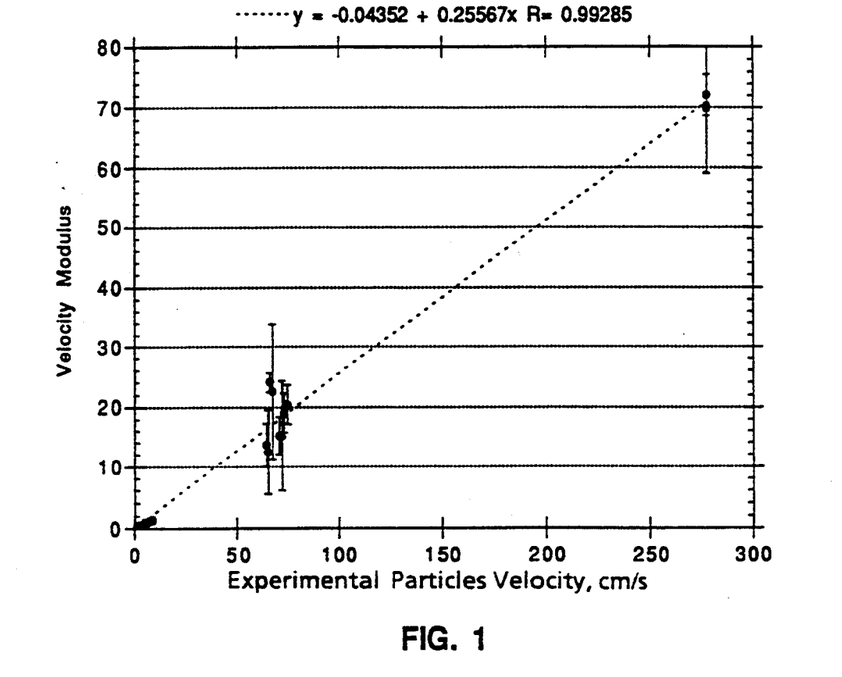
FIG. 1 is a plot of velocity modulus (obtained by using the method of this invention) versus experimental particle velocity data (measured as described infra in the "Specific Embodiments" section).

Application of the Invention to Determine Particle Velocities and Concentrations Particle velocities are determined by using Equation 5. As shown in FIG. 1, a linear relationship exists between the velocity modulus ($\Omega$), calculated in Equation 4, and actual measured particle velocities. In general, the velocity modulus provides a linear relationship for solids velocities ranging from 0 to 300 cm/s, as illustrated in FIG. 1. Thus, the probe is well suited for measuring both high velocity particles in a pneumatic transport tube, and low velocity particles commonly found in a cyclone dipleg. The slope in FIG. 1, 0.25567, represents the proportionality constant, k′, in Equation 5 for the 600 μm alumina particles used in the above described examples. In addition, from the magnitude of the modulus deviations, it is possible to determine both the width of the velocity distribution and the uniformity of the flow.

Concentration (Invention)

Figure 2:
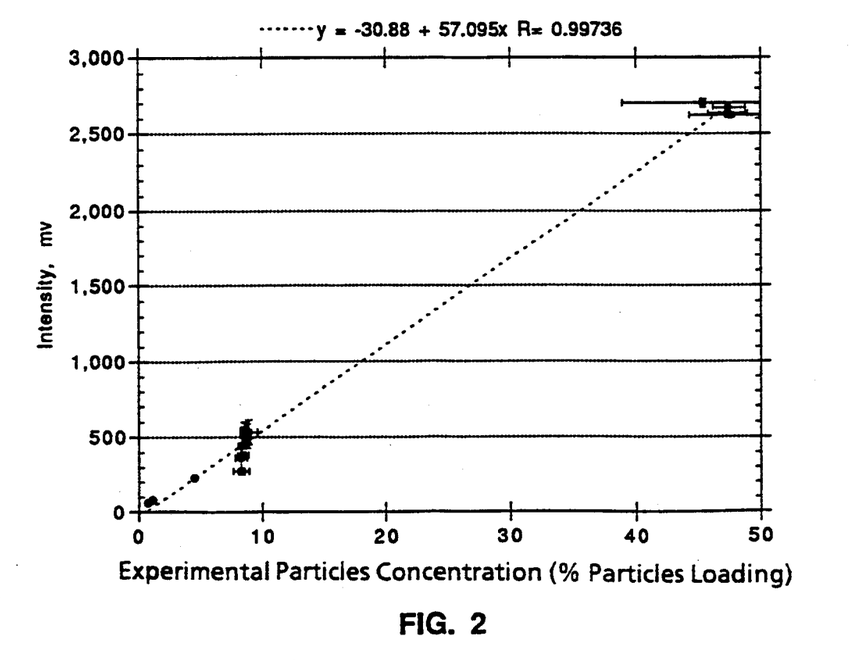
FIG. 2 is a plot of detected light intensity (obtained by using the method of this invention) versus experimental concentration (measured as described infra in the "Specific Embodiments" section). A sampling period of 0.1 ms/sample is used.

Concentrations are determined simultaneously with particle velocities using the method of this invention. The probe average intensity and the experimental concentrations for particle flow in multi-phase systems are shown in FIG. 2. Average probe intensities are calculated via Equation 1. The average probe intensity responds in a linear fashion as the concentration increases from 1 to 50% solids loadings using the above described apparatuses. The slope in the FIG. 2, 57.095, represents the proportionality constant, k, in Equation 2 for the 600 μm alumina particles used in the above apparatuses.

As FIG. 2 depicts at approximately 2,700 mV, the measured light intensity may not accurately segregate concentrations over a particular range of measured concentration values. In such a situation, higher resolution in particle concentration may be obtained by using a smaller sampling period. However, a smaller sampling period will also reduce the concentration range in which the probe can be used. For example, collecting data at a higher sampling frequency (e.g. 20 samples/ms) or lowering the sampling period (e.g. 0.05 sample/ms) is sufficient to segregate the concentration values obtained in a riser apparatus with concentrations between 10% to 20%.

Comparative Example

Figure 3A:
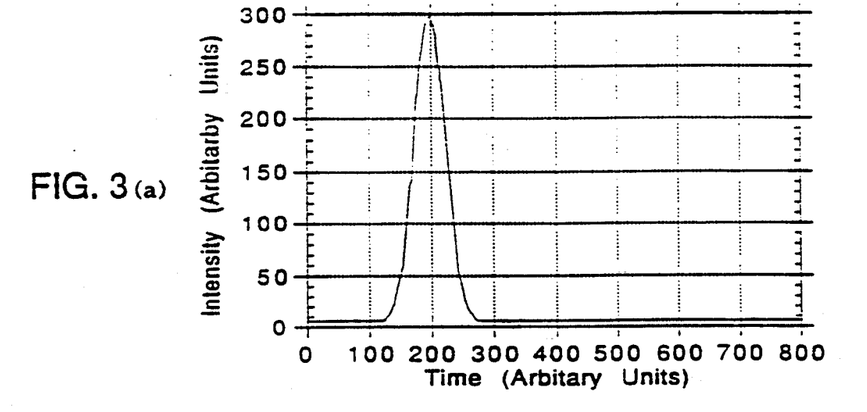
Figure 3B:
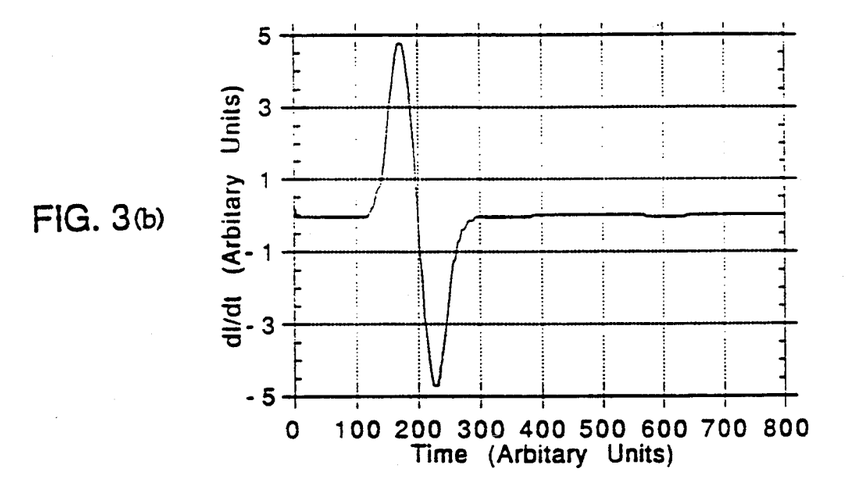
Figure 3C:
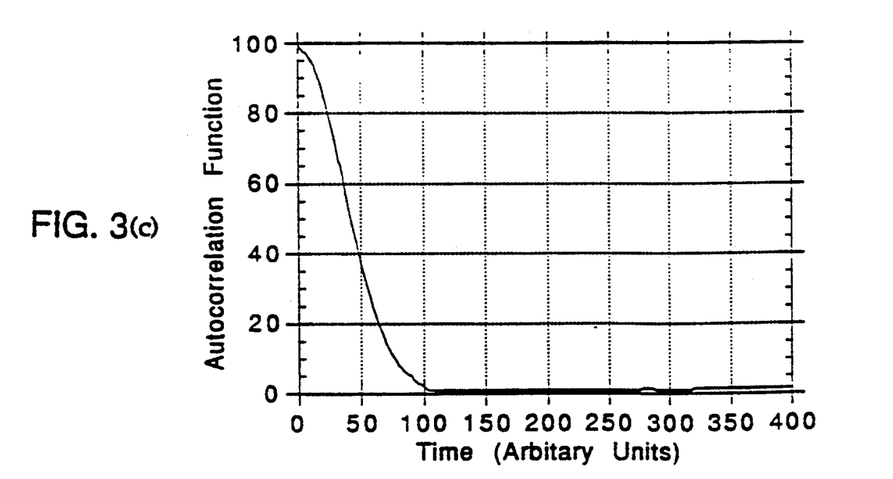
Figure 4A:
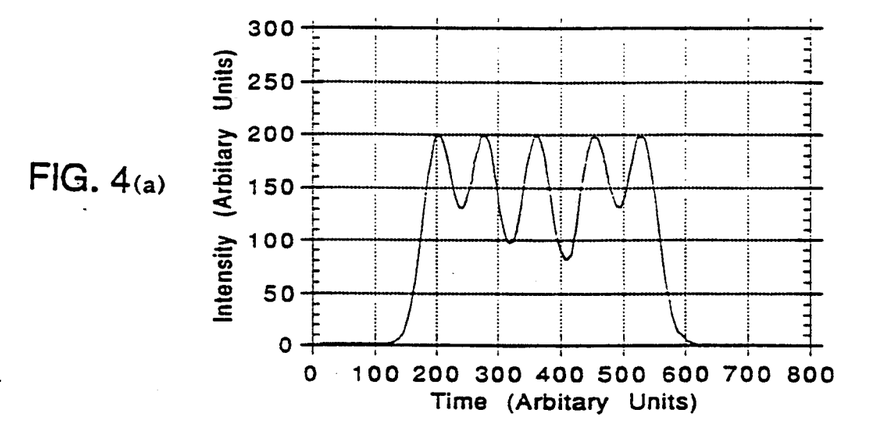
Figure 4B:
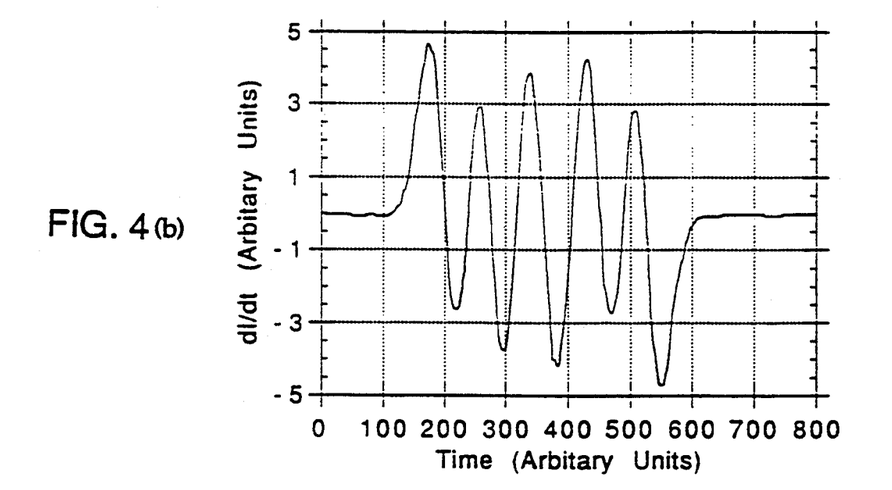
Figure 4C:
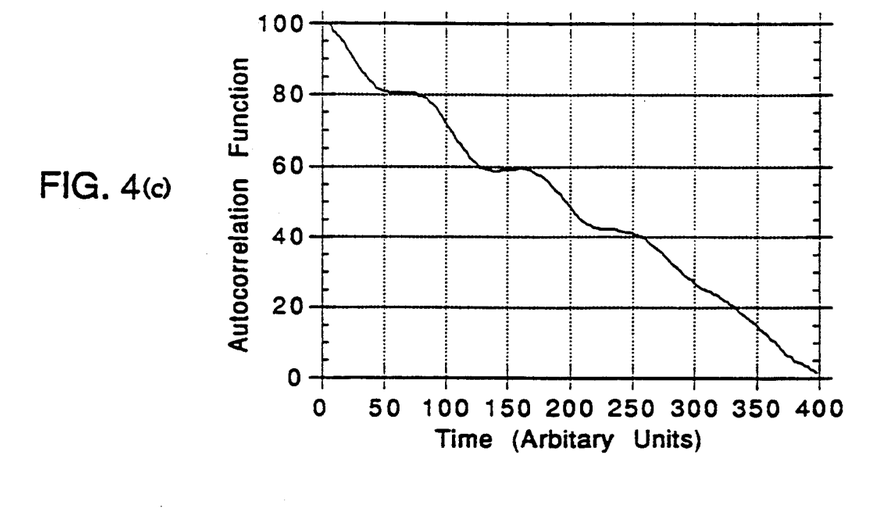
Figure 5A:
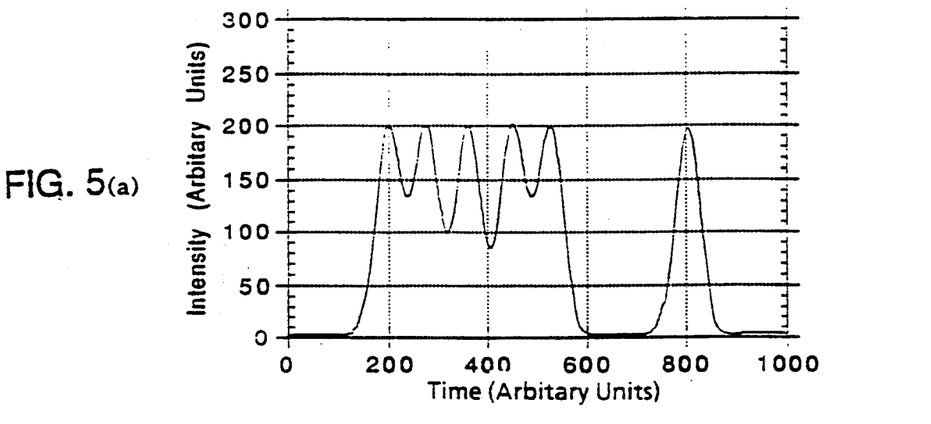
Figure 5B:
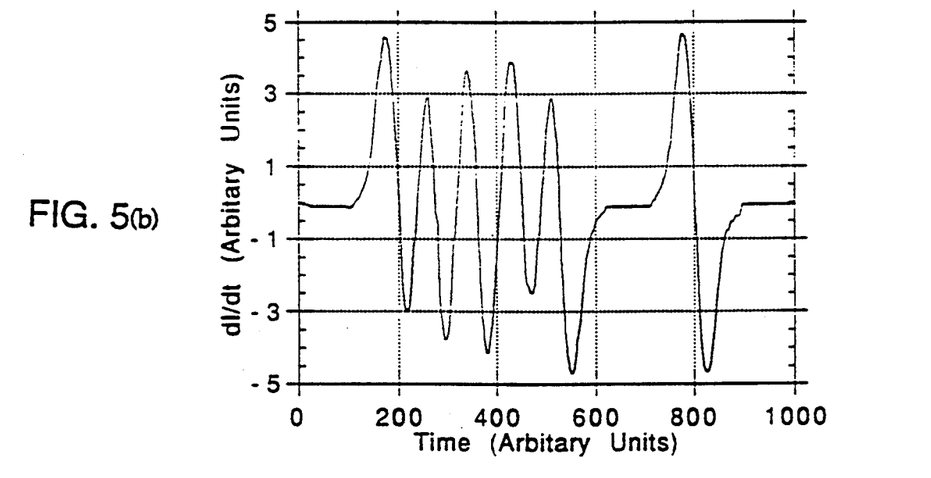
Figure 5C:
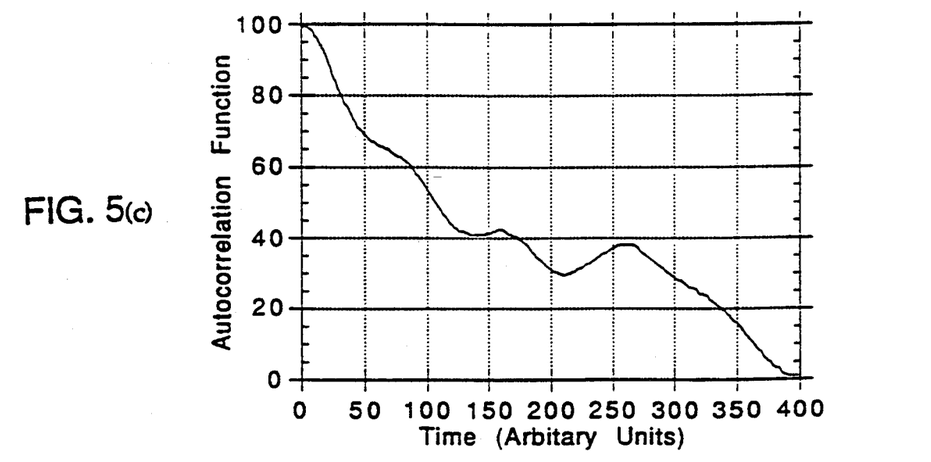
Figure 6:
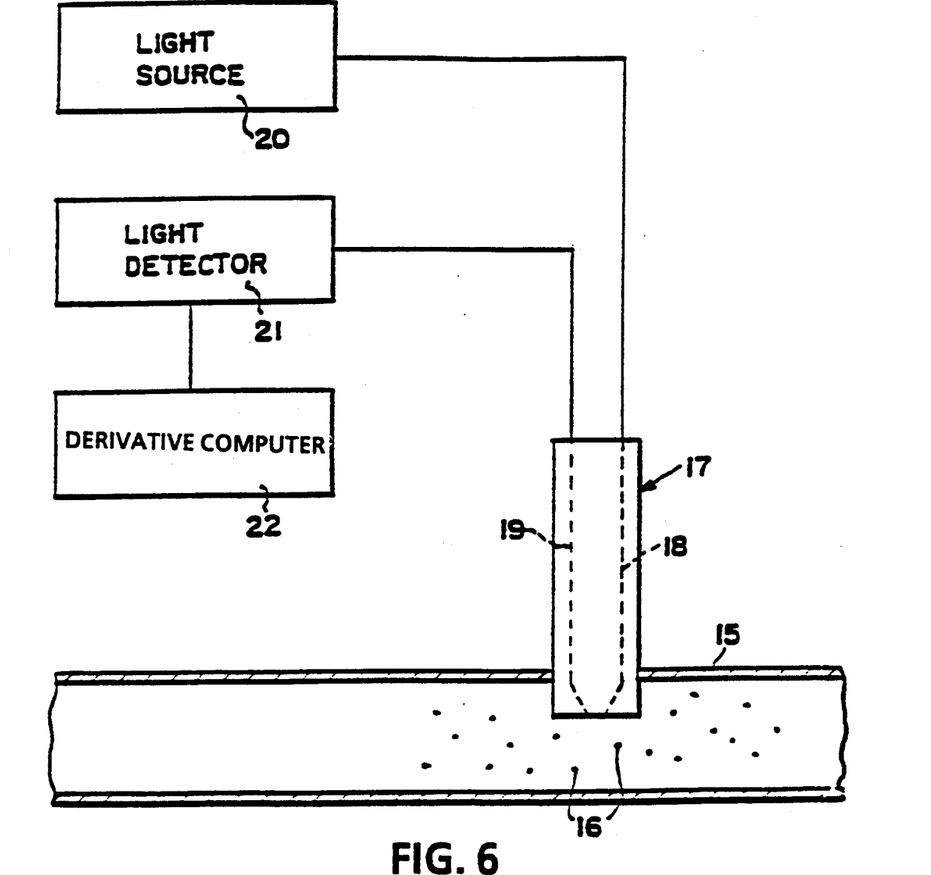
FIG. 6 is a schematic block diagram that illustrates a fluid medium flowing in a pipe 15, the fluid medium containing therein particles 16 capable of backscattering light. A fiber optic probe 17 having a light transmitting optical fiber 18 and light collecting optical fiber 19 is inserted within pipe 15, immersing the probe 17 in the fluid medium. Fiber 18 is operatively coupled to a light source 20 and fiber 19 is operatively coupled to a light detector 21. A derivative computer 22 is connected with light detector 21 to complete the system. Derivative computer 22 determines velocity of particles 16 by forming a voltage waveform with respect to time, computing a derivative of the waveform, normalizing the derivative with respect to concentration, and multiplying the normalized derivative by an appropriate calibration constant.

FIG. 3 shows a computer-generated data array of a single peak with Gaussian-like profile ($\sigma=25$) (FIG. 3(a)), a corresponding first derivative (FIG. 3(b)), and an autocorrelation profile (FIG. 3(c)). The maximum first derivative, determined using the method of this invention, is 5.00, corresponding to the inflection point on the single peak waveform. The autocorrelation time at $t_{50}$ is 43. As concentration of the particles increases, the occurrence of multiple nonresolved peaks becomes more likely, as shown in FIG. 4. The simulated speed for each particle in FIG. 4 is the same as that used in FIG. 3. The maximum first derivative, determined by the method of this invention, is 5.00 (FIG. 4(b)), consistent with the maximum first derivative in FIG. 3 (FIG. 3(b)). However, for the autocorrelation method, a $t_{50}$ of 196 is determined (FIG. 4(c)) which is not comparable to the $t_{50}$ of 43 in FIG. 3 (FIG. 3(c)). Even if there is a single isolated peak, in addition to the multiple peak ensemble, the autocorrelation function still fails. FIG. 5 shows the data array for an ensemble of peaks with an additional fully resolved peak. The maximum of the first derivative of this waveform is 5.00 (FIG. 5(b)). The autocorrelation $t_{50}$ for this waveform is 110 (FIG. 5(c)). Thus, the derivative method, as opposed to the autocorrelation method, is well suited for application not only in uniformly distributed multi-phase streams, but nonuniformly distributed multi-phase streams as well.

What is claimed is:

1. An improved method for determining particle velocity in a fluid medium containing particles capable of backscattering light by illuminating a single, finite and symmetrical zone of said fluid medium with light capable of being backscattered by said particles, collecting backscattered light from said zone, converting said backscattered light into at least one voltage waveform with respect to time, and determining velocity from said waveform(s), the improvement comprising determining velocity of said particles by computing a derivative of the voltage waveform(s) with respect to time, normalizing the derivative with respect to concentration, and multiplying the normalized derivative by a calibration constant, k'.

2. The method of claim 1 wherein said improvement also comprises determining particle concentration by computing an average value of said voltage waveform(s) and multiplying the value by a calibration constant, k.

3. The method of claim 1 wherein said fluid medium comprises a liquid.

4. The method of claim 1 wherein said fluid medium is gaseous.

5. The method of claim 1 wherein said particles are in the form of solids, bubbles, or immiscible droplets.

6. The method of claim 1 wherein said waveform forms a peak and particle velocity is inversely proportional to peak width which, in turn, is inversely proportional to a derivative of said peak.

7. The method of claim 1 wherein the derivative is a maximum of a first derivative of the voltage waveform(s) with respect to time.

8. The method of claim 1 wherein said particles are present in the range of 1 ppm to 60% by volume.

9. The method of claim 1 wherein said particles are at least 10 microns in size.

* * * * *